United States Patent
Asakura et al.

(10) Patent No.: US 9,925,981 B2
(45) Date of Patent: Mar. 27, 2018

(54) STOP-AND-RESTART CONTROL OF A VEHICLE ENGINE

(71) Applicant: HONDA MOTOR CO., LTD., Tokyo (JP)

(72) Inventors: Masahiko Asakura, Wako (JP);
Hiroshi Yoneguchi, Wako (JP);
Tadayoshi Okada, Wako (JP); Ryuji Sato, Wako (JP); Kohei Hanada, Wako (JP); Eisuke Horii, Wako (JP);
Yoshinari Sugita, Wako (JP); Shunichi Kawasumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/114,245

(22) PCT Filed: Feb. 5, 2014

(86) PCT No.: PCT/JP2014/000608
§ 371 (c)(1),
(2) Date: Jul. 26, 2016

(87) PCT Pub. No.: WO2015/118570
PCT Pub. Date: Aug. 13, 2015

(65) Prior Publication Data
US 2017/0001640 A1    Jan. 5, 2017

(51) Int. Cl.
*B60W 30/16*    (2012.01)
*F02N 11/08*    (2006.01)
(Continued)

(52) U.S. Cl.
CPC ............ *B60W 30/16* (2013.01); *B60W 10/06* (2013.01); *B60W 10/184* (2013.01);
(Continued)

(58) Field of Classification Search
CPC .... B60W 30/16; B60W 10/06; B60W 10/184; B60W 2550/142; B60W 2540/12;
(Continued)

(56) References Cited

U.S. PATENT DOCUMENTS 6,311,122 B1   10/2001   Higashimata
7,337,056 B2 *   2/2008   Arai ................... B60K 31/0008
                                                           180/170

(Continued)

FOREIGN PATENT DOCUMENTS

JP    2000-313246 A    11/2000
JP    2006-183600 A    7/2006
(Continued)

OTHER PUBLICATIONS

International Search Report dated May 13, 2014, issued in counterpart international application No. PCT/JP2014/000608(2 pages).
Office Action dated Nov. 14, 2017, issued in counterpart Japanese Application No. 2015-560847, with English machine translation. (7 pages).

(Continued)

*Primary Examiner* — David J Hlavka
(74) *Attorney, Agent, or Firm* — Westerman, Hattori, Daniels & Adrian, LLP

(57) ABSTRACT

A control unit for a vehicle comprises an automatic engine stop-and-restart unit for stopping the engine responsive to predefined stop conditions and for restarting the engine responsive to predefined restart conditions, and a following-cruise control unit for controlling the vehicle to follow a vehicle ahead responsive to predefined following-cruise conditions. The automatic stop-and-restart unit for stopping and restarting the engine is configured to modify at least one of the stop conditions and the restart conditions during the following-cruise control.

10 Claims, 10 Drawing Sheets

(51) Int. Cl.
*B60W 10/06* (2006.01)
*B60W 10/184* (2012.01)
*F02D 41/04* (2006.01)
*F02D 41/06* (2006.01)

(52) U.S. Cl.
CPC ......... *F02D 41/042* (2013.01); *F02D 41/065* (2013.01); *F02N 11/0833* (2013.01); *F02N 11/0837* (2013.01); *B60W 2520/10* (2013.01); *B60W 2540/12* (2013.01); *B60W 2550/142* (2013.01); *F02N 2200/0807* (2013.01); *F02N 2200/124* (2013.01); *F02N 2200/125* (2013.01); *Y02T 10/48* (2013.01)

(58) Field of Classification Search
CPC .............. B60W 2520/10; F02D 41/042; F02D 41/065; F02N 11/0833; F02N 11/0837; F02N 2200/124; F02N 2200/0807; F02N 2200/125
See application file for complete search history.

(56) References Cited

U.S. PATENT DOCUMENTS

| | | | |
|---|---|---|---|
| 9,126,596 B2* | 9/2015 | Ando | B60W 30/14 |
| 2006/0142121 A1 | 6/2006 | Moriya | |
| 2006/0212207 A1* | 9/2006 | Sugano | B60W 10/06 |
| | | | 701/93 |
| 2015/0224991 A1* | 8/2015 | Sudou | B60W 30/143 |
| | | | 701/96 |
| 2015/0232094 A1* | 8/2015 | Sudou | B60W 30/143 |
| | | | 701/93 |

FOREIGN PATENT DOCUMENTS

| | | |
|---|---|---|
| JP | 2006-321268 A | 11/2006 |
| JP | 4766330 B2 | 9/2011 |
| JP | 2012-112754 A | 6/2012 |
| JP | 2012-255383 A | 12/2012 |
| JP | 2013-068178 A | 4/2013 |
| JP | 2013-199843 A | 10/2013 |

* cited by examiner

STOP-AND-RESTART CONTROL OF A VEHICLE ENGINE

FIELD OF THE INVENTION

The present invention relates to a method and an apparatus for controlling a vehicle, and more particularly to a method and an apparatus for stop-and-restart control of an internal combustion engine under predefined conditions.

BACKGROUND ART

There has been developed a vehicle having a so-called idling-stop function wherein the engine is stopped for reducing fuel consumption, for example, at a traffic light and restart when the light switches to green. There can be variety of conditions for idling stop, a gradient of a road surface being a typical example. The vehicle may make an unexpected movement due to various failures when the vehicle stops in an inclined road causing idling stop and is restarted.

Conventionally, a vehicle having an idling-stop function is known (patent document 1), wherein a range of road gradient for which idling-stop is allowed is changed until failure analysis of the idling stop function is completed. However, control of a vehicle includes a variety of functions other than idling-stop and therefore idling-stop needs be controlled in association with the other functions.

PRIOR ART DOCUMENT

Patent Document 1: Japanese Patent Application Publication No. 2012-255383

SUMMARY OF THE INVENTION

Problems to be Solved by the Present Invention

Functions for controlling a vehicle include a cruise control which controls the vehicle to follow a preceding vehicle. There is a need for a control unit for a vehicle that includes a link between the cruise control and the idling-stop control thereby achieving a highly safe control of the vehicle.

Means for Resolving the Problems

A control unit for a vehicle according to one embodiment of the present invention comprises an automatic engine stop-and-restart unit for stopping the engine responsive to predefined stop conditions and for restarting the engine responsive to predefined restart conditions, and a following-cruise control unit for controlling the vehicle to follow a vehicle ahead responsive to predetermined following-cruise conditions.

The automatic stop-and-restart unit for stopping and restarting the engine is organized to modify at least one of the stop conditions and the restart conditions during the following-cruise control by the following-cruise control unit.

According to one aspect of the present invention, the control unit of a vehicle is further provided with a gradient sensor for acquiring conditions of the gradient of the road where the ego-vehicle (note: an ego-vehicle is a vehicle that you drive) is located. The engine-stop conditions include gradient conditions of the road surface, typically the gradient of the road surface as acquired by the gradient sensor being smaller than a threshold value. The automatic stop-and-restart unit for stopping and restarting the engine, during the following-cruise control, modifies the threshold value of the gradient to a smaller value as compared with the road surface gradient conditions when the following-cruise control is not active.

In accordance with another aspect of the present invention, the control unit of a vehicle includes a vehicle speed sensor for detecting speed of the ego-vehicle. When the following-cruise control is not active, the restart conditions include detection of a vehicle speed by the vehicle speed sensor exceeding a predetermined value, and when the following-cruise control is active, the restart conditions exclude such detection of a vehicle speed exceeding a predetermined value.

In accordance with another aspect of the present invention, the control unit of the vehicle further includes a gradient sensor for acquiring conditions of gradient of a road surface. When the following-cruise control is not active, the restart conditions include detection of a vehicle speed by the vehicle speed sensor exceeding a predetermined value, and when the following-cruise control is active and the gradient sensor detects driving along a downhill, the restart conditions exclude detection of the vehicle speed exceeding a predetermined value.

In accordance with another aspect of the invention, the control unit of a vehicle further includes a brake control unit for braking the ego-vehicle and a brake sensor for acquiring conditions of a driver driven brake pedal.

During the following-cruise control, when the vehicle speed is detected to be larger than a predetermined speed, the brake control unit applies brake to the ego-vehicle. In such a case, engine restart conditions associated with the automatic engine stop-and-restart unit include brake applied by the brake control unit, detection of activation of the brake pedal, or halt of the ego-vehicle.

In accordance with another aspect of the invention, the control unit of a vehicle further includes a failure determination unit that determines, while the following-cruise control is inactive, whether or not engine stop-and-restart has been normally performed by the automatic engine stop-and-restart unit. The automatic engine stop-and-restart unit adds, as a stop condition, the condition that the failure determination unit has determined that the engine stop-and-restart has been performed normally.

In accordance with another aspect of the invention, the control unit of a vehicle further includes a failure determination unit that determines, while the following-cruise control is inactive, whether or not engine stop-and-restart has been normally performed by the automatic engine stop-and-restart unit. The automatic engine stop-and-restart unit adds, as a restart condition, the condition that the following-cruise control is started while failure determination by the failure determination unit has not been completed.

In accordance with another aspect of the invention, the automatic engine stop-and-restart unit adds, as a stop condition, the condition that, when the following-cruise control is active, and when the ego-vehicle stopped by the following cruise control, the headway to the vehicle ahead is larger than a predetermined threshold value.

In accordance with another aspect of the invention, the control unit of a vehicle is further provided with a gradient sensor for acquiring the gradient conditions of the road surface where the ego-vehicle is. The threshold for the headway may be modified based on the detected gradient of the road surface.

In accordance with another aspect of the invention, the control unit for a vehicle is further provided with a means for determining warm-up of the engine. The engine stop conditions include the conditions that the cooling water temperature or the lubricating oil temperature is higher than a predetermined threshold value, or that the target idling revolutions is lower than a predetermined revolution threshold. The automatic engine stop-and-restart unit, while the following-cruise control is active, modifies the temperature threshold to a higher value than the value for the period when the following-cruise control is inactive, or modifies the revolution threshold to a smaller value than the value for the period when the following-cruise control is inactive.

The method of controlling a vehicle in accordance with the present invention comprises the steps of stopping the engine upon meeting predetermined stop conditions, restarting the engine upon meeting predetermined restart conditions, performing following-cruise control upon meeting predetermined following-cruise control conditions to follow a vehicle ahead, and modifying at least one of the stop conditions and the restart conditions while the following-cruise control is active.

DESCRIPTION OF THE EMBODIMENT

Reference is made to the accompanied drawings. The control unit of a vehicle in accordance with the respective embodiments of the present invention achieves a highly safe control in association with following-cruise function for following a vehicle ahead and idling-stop function.

Figure 1:
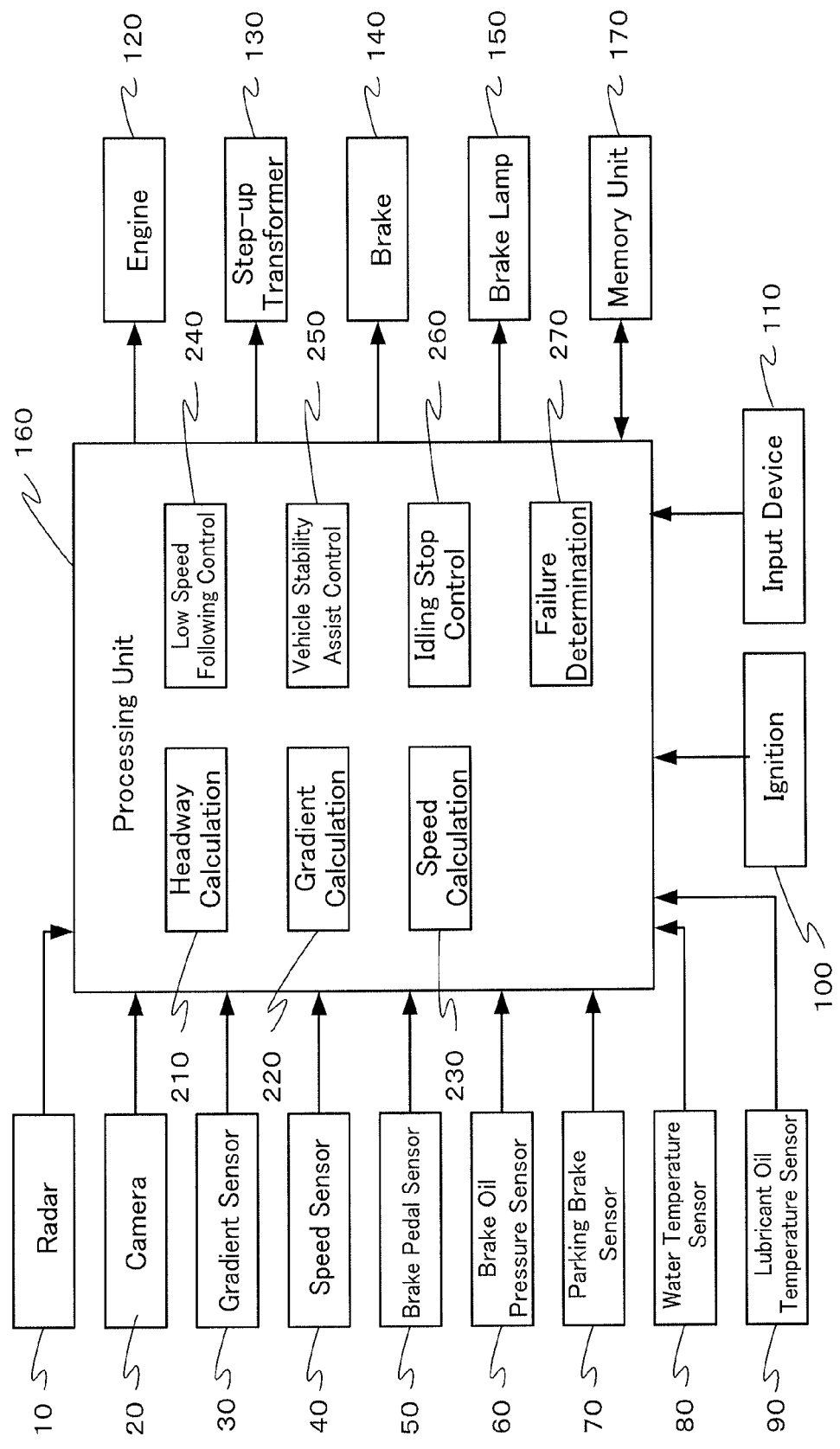
FIG. 1 is a block diagram illustrating a control unit for a vehicle according to one embodiment of the present invention.

FIG. 1 is a block diagram illustrating a structure of a control unit of a vehicle according to an embodiment of the present invention.

A radar 10 emits a radio wave toward an object and measures a reflected wave to determine the distance and orientation relative to the object. Radar 10 is placed at a front portion of the vehicle to detect other vehicles ahead of the ego-vehicle. Radar 10 is used to measure the headway to a vehicle ahead.

A camera 20 is a device for capturing images. Camera 20 is placed at a front portion of the vehicle to capture images in front of the ego-vehicle. The captured images are used to measure headway to a vehicle ahead.

A gradient sensor 30 acquires conditions of gradient of a road surface where the ego-vehicle is. Gradient sensor 30 is a sensor that detects front-to-rear gradient, and for example an acceleration sensor is used to measure a gradient. The gradient sensor measures gravity acceleration imposed to the ego-vehicle for determining gradient of the ego-vehicle, which corresponds to the gradient of the road surface.

A sped sensor 40 is a sensor for detecting travel speed of a vehicle. In one embodiment, it includes a rotary pulse generator which produces pulses responsive to revolution of a wheel of the vehicle. Vehicle speed is determined by counting the number of produced pulses per a unit time.

A brake pedal sensor 50 detects openings a brake pedal as the driver operates it. Brake pedal sensor 50 is one of brake sensors and acquires brake conditions in terms of brake pedal operated by the driver. Brake pedal sensor 50 detects activation of the brake pedal which corresponds to driver-initiated braking action.

A brake liquid pressure sensor 60 detects liquid pressure of a braking system for braking a vehicle. Brake liquid pressure sensor 60 is one of the brake sensors for acquiring braking conditions of the brake pedal that is operated by the driver. Brake liquid pressure rises when brake power is applied.

A parking brake sensor 70 detects activation of a parking brake by the driver.

A water temperature sensor 80 detects temperature of cooling water for cooling engine 120, and is mounted within a radiator.

A lubrication oil temperature sensor 90 detects the temperature of lubrication oil and is mounted to a lubrication system of engine 120.

An ignition 100 is a switch for starting engine 120 of the vehicle and is operated by the driver. Ignition 100 detects that the driver has started engine 120 of the vehicle.

An input unit 110 is a unit for the driver to set various items and is composed of one or more of switch, button, touch panel and others. The driver may use input unit 110 to enter on/off of LSF to be described hereafter, headway and others.

An engine 120 is an internal combustion engine for producing power for moving the vehicle.

A step-up transformer 130 raises electric voltage to a voltage that is required to run various devices provided to the vehicle when a battery voltage drops. Step-up transformer 130 is formed by a DC-DC converter.

A brake 140 is a device that provides physical braking power to decelerate the vehicle or to bring the vehicle to a halt. Brake 140 may include various brakes such as a hydraulic brake, a mechanical brake, and others.

A braking lamp 150 is an indicator indicating that a brake power is applied to the vehicle and is provided mainly at the rear portion of the vehicle so that it may be seen from the vehicles behind.

A processing unit 160 is a computer having a processor such as a CPU (Central Processing Unit), and a memory such as a ROM (Read Only Memory) containing computer programs and a RAM (Random Access Memory) for temporarily storing data. Processing unit 160 comprises functional units, which includes a headway calculating unit 210, gradient calculating unit 220, vehicle speed calculating unit 230, LSF control unit 240, VSA control unit 250, idling stop control unit 260, and failure determining unit 240. The functions of processing unit 160 are achieved by the processing unit 160 as a computer executing computer programs, which may be stored in a computer readable storage media.

The respective functional units of processing unit 160 may be composed of dedicated hardware, each having one or more electric components. Respective units of processing unit 160 may be referred to in terms of individual units.

A memory unit 170 may be a semiconductor memory, a hard disk drive (HDD), any type of non-volatile memory and a combination of a non-volatile memory and a volatile memory. Memory unit 170 stores working data, which are produced or are referred to by various tables and processing unit 160.

Respective units of processing unit 160 will now be described. Headway calculating unit 210 calculated the headway (distance) between the ego-vehicle and a vehicle ahead of the ego-vehicle based on the signals detected by radar 10 and/or the images captured by camera 20.

Gradient calculating unit 220 calculates, in terms of percentage, the gradient of the road surface during driving or standing halt, which is detected by gradient sensor 30. For example, horizontal plane without inclination is represented by 0%, 45 degree rising inclination represented by 100%, and 45 degree falling inclination represented by −100%.

Gradient calculating unit 220 calculates gradient not only when the vehicle is at halt, but also when the vehicle is travelling. During travelling of the vehicle, acceleration degree can be calculated from the number of revolution of the engine and transmission status. When an acceleration sensor is used as gradient sensor 30, gradient of the road surface may be calculated by reducing the acceleration degree from the value detected by gradient sensor 30.

A vehicle speed calculation unit 230 calculates vehicle speed by counting the pulses generated by vehicle speed sensor 40. The vehicle speed thus calculated may be used to determine movement of the vehicle.

LSF control unit 240 controls a low speed following (LSF) driving. The LSF driving can be a part of the adaptive cruise control (ACC) function. The ACC function provides, as one of its functions, driving control to follow a vehicle travelling ahead of the ego-vehicle when predetermined following-control conditions are met. In contrast to the conventional cruise control that is designed to maintain a constant speed which is preset or may be manually set, the ACC has a function of maintaining a constant headway relative to the vehicle ahead of the ego-vehicle. Thus, the ACC is a speed control system in one aspect and is a vehicle-following system in another aspect.

A VSA control unit 250 controls a vehicle stability assist (VSA) control system which prevents skid or sideslip of a vehicle. The vehicle stability assist (VSA) is also called vehicle stability control (VSC). VSA control unit 250 may control brake 140 without a driver's operation. VSA control unit 250 may be regarded as one type of a brake control unit that controls application of braking power to the ego-vehicle.

The VSA also works when LSF is active. LSF control unit 240 sends a command to VSA control unit 250 when the vehicle travelling ahead of the ego-vehicle has become to a halt. Based on this command, VSA control unit 250 controls to apply braking power to brake 140 to bring the ego-vehicle to a halt.

Idling stop control unit 260 automatically stops and restart engine 120. Idling stop control unit 260 performs idling stop control by stopping engine 120 upon establishment of predetermined stop conditions and restarting engine 120 upon establishment of restart conditions. The predetermined stop conditions and restart conditions include gradient of the road surface, vehicle speed, headway, engine water temperature, lubrication oil temperature, brake-liquid pressure and others. Idling stop control unit 260 automatically stops and restarts engine 120 when, for example, the ego-vehicle halts and waits at the lights.

Idling stop is also referred to as no idling, or idle reduction.

Idling stop control unit 260 works while LSF is active too. When LSF is active and when the vehicle ahead slows down and halts, VSA control unit 250 applies braking power to brake 140 and ultimately brings the ego-vehicle to a halt, and under predefined conditions stops engine 120.

Failure determining unit 270 determines if automatic engine stop operation and automatic engine restart operation have been performed normally. The determination result is stored in memory unit 170. Failure determining unit 270 conducts this determination irrespective whether LSF is active or inactive.

Processing unit 160 cooperatively controls, relative to LSF control, relevant idling stop control and other controls. LSF control affects the performance of the vehicle in association with the other controls. Various units of processing unit 160 cooperate with each other to achieve an adequate performance of the ego-vehicle as a whole.

A First Aspect

A first aspect of the present invention will now be described.

LSF has a function to halt the vehicle by braking control performed by VSA control unit 250 even when the driver has not pushed down on the brake pedal, which may result in idling stop when the brake pedal is not pushed down. If step-up transformer 130 has failed at this time, engine restart from idling stop may cause fall down of voltage by cranking operation for restarting the engine, which may end up with resetting VSA (vehicle stability assist system).

If VSA is reset, it fails to apply braking power to the vehicle, which may lead to an undesired movement of the vehicle when the driver is not pressing the brake pedal and when the vehicle is on a slope because no driving power or braking power is applied to the vehicle.

Various stop conditions and restart conditions are set for the idling stop, one of which is a gradient condition for the road surface requiring the road surface gradient to be less than a threshold value. Idling stop control unit 260 changes this gradient condition to a mild gradient when LSF (low speed following) is active. Idling stop control unit 260 changes the engine stop conditions such that idling stop is not permitted when a current gradient is outside the range of gradient conditions of a mild gradient, whereby un-expected movement of the ego-vehicle at a slope may be avoided.

Figure 2:
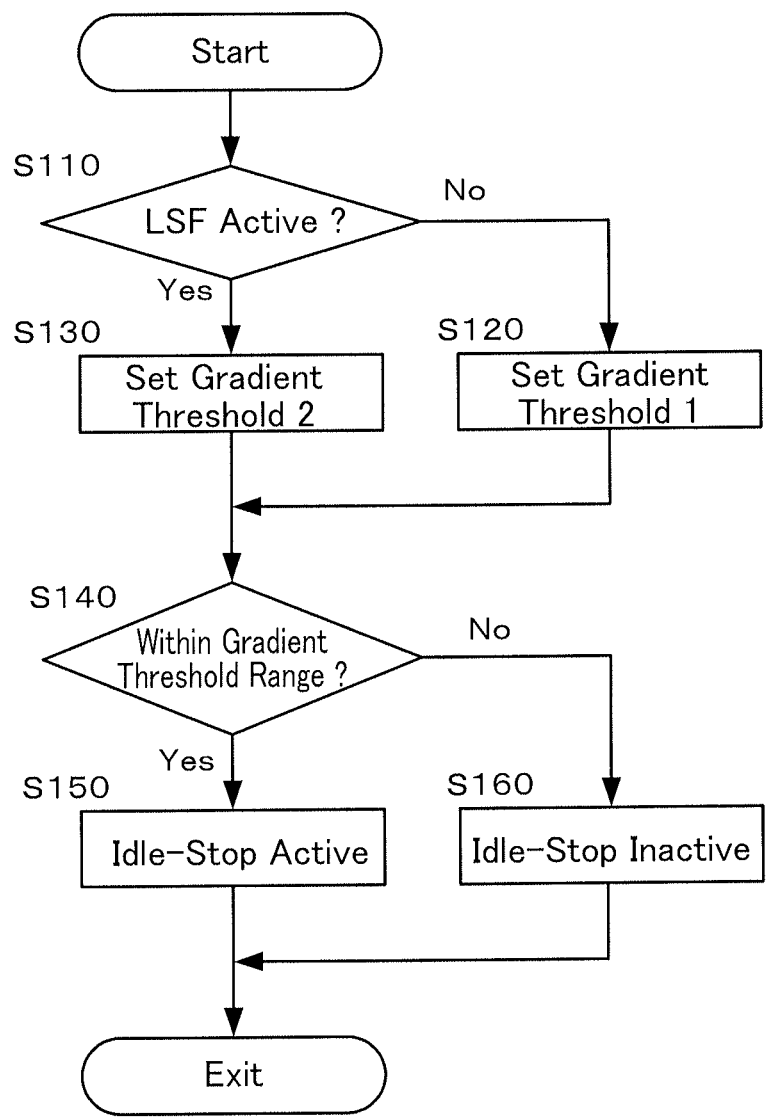
FIG. 2 is a flow chart showing the operational steps of the control unit for a vehicle according to a first embodiment of the present invention.

FIG. 2 illustrates a flow chart showing operational steps of the control unit according to the first embodiment of the present invention. In the drawings, idling stop may be referred to as "IS".

In step S110, idling stop control unit 260 determines if LSF (low speed following) is active. Such determination may be made by referring to the set contents that LSF control unit 240 has written into memory unit 170. If LSF is inactive, the process proceeds to step S120, and if SF is active the process proceeds to step S130.

In step S120, idling stop control unit 260 sets as gradient threshold 1 a value of a regular gradient. The gradient threshold 1 is, for example, 1.4% for an uphill and 10% for a downhill. The gradient thresholds are stored in memory unit 170. The process proceeds to step S140.

In step S130, idling stop control unit 260 sets as gradient threshold 2 a value that is smaller than the gradient threshold 1. The gradient threshold 2 is set on the basis of a range that can be regarded as substantially plane or flat. For example, a rage of upward gradient 3% and downward gradient 3% is set. The process proceeds to step S140.

In step S140, idling stop control unit 260 determines if the gradient of the road surface as calculated by gradient calculation unit 220 is within the thresholds. If it is within the thresholds, the process moves to step S150, otherwise the process moves to step S160.

In step S150, idling stop control unit 260 performs the process of activating idling stop, and exits the process thereafter. In step S160, idling stop control unit 260 prohibits idling stop operation and exits the process thereafter.

With above procedure, when LSF is active, engine stop conditions are changes such that idling stop may not be activated unless the current road surface gradient is smaller than the gradient threshold that is smaller than the regular gradient threshold.

By changing the engine stop conditions to narrower the road surface gradient for permitting idling stop, even when step-up transformer 130 has failed, unexpected movement of the ego-vehicle may be prevented.

A Second Aspect

Now, a second aspect of a control unit in accordance with the present invention will be described. The engine restart conditions include a condition that the vehicle speed is higher than a predefined speed. When the ego-vehicle starts to move during idling-stop and the vehicle speed exceeds a predefined speed, idling-stop control unit 260 restarts engine 120 automatically. When the ego-vehicle starts to move, the driver would assume that engine 120 is active. The automatic engine-restart is performed so that the ego-vehicle accelerates when the driver presses the acceleration pedal. The driver would feel uncomfortable or puzzled if the ego-vehicle does not accelerate even if the driver presses the acceleration pedal.

However, during LSF (low speed following) driving, and when the vehicle is on a downhill, if engine 120 is automatically restarted, forward movement increases due to creeping and due to its weight. Therefore, idling-stop control unit 260 prohibits restarting of engine 120 when movement of the ego-vehicle is detected during idling-stop and LSF driving while the ego-vehicle is on a downhill.

The engine-restart conditions for the period while LSF is inactive include the condition that the vehicle speed is higher than a predefined speed. But the engine-restart conditions for the period while LSF is active do not include this condition so that increase of forward movement when the ego-vehicle moves on a downhill may be suppressed.

Figure 3:
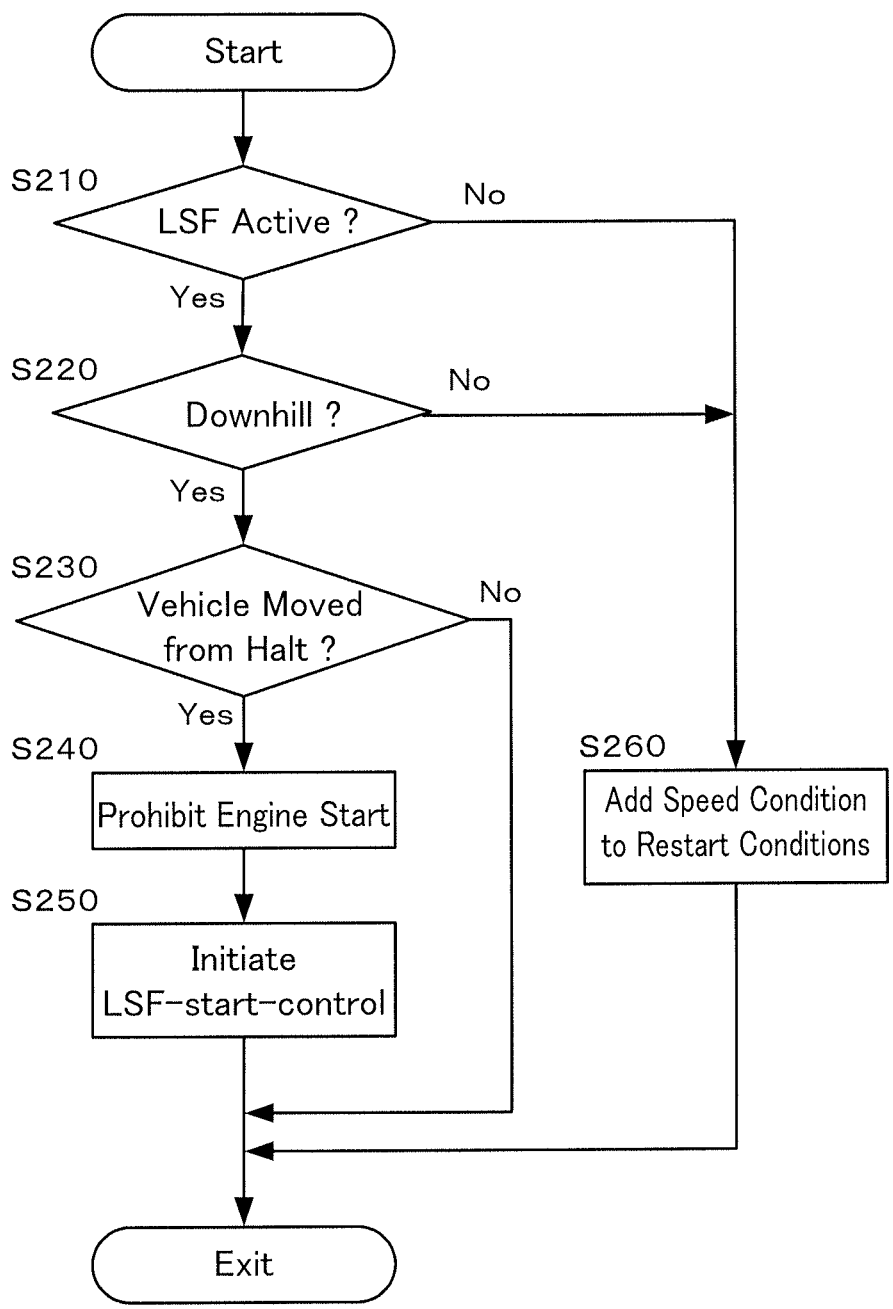
FIG. 3 is a flow chart showing the operational steps of the control unit for a vehicle according to a second embodiment of the present invention.

FIG. 3 illustrates procedures of the vehicle control unit in accordance with the second embodiment of the present invention. The procedure starts from idling-stop condition with the ego-vehicle at halt.

In step S210, idling-stop control unit 260 determines if LSF (low speed following) is active. If it is not active, process moves to step S260, and if active the process moves to step S220.

In step S220, idling-stop control unit 260 determines if the ego-vehicle is on a downhill by referring to minus sign attached to a gradient calculated by gradient calculation unit 220. If the determination is a downhill, the process moves to step S230.

If the determination is not a downhill, the process moves to step S260. If the vehicle is on an uphill, engine-restart is not prohibited as the backward force applied to the vehicle by the uphill works against the forward and upward drive by the engine, thus engine-start works to prevent movement of the vehicle.

In step 230, idling-stop control unit 260 determines if the vehicle moved from halt based on the vehicle speed calculated by vehicle speed calculation unit 230. The vehicle speed calculated by vehicle speed calculation unit 230 is compared with a predefined speed corresponding to a halt condition. Idling-stop control unit 260 determines that the vehicle has moved if the detected vehicle speed is higher than a predefined speed.

Normally, the vehicle would not move as VSA control unit 250 applies braking power, but it may move due to erroneous detection or failure of step-up transformer 130. The process of step S230 provides failsafe for such occasions.

When movement of the vehicle is not determined, the process moves to step S260. When movement of the vehicle is determined, the process moves to step S240.

In step S240, idling-stop control unit 260 performs the process of prohibiting engine-restart. As the vehicle needs be brought to a halt, LSF control unit 240 sends a command to VSA control unit 250 so that VSA control unit 250 applies braking power. VSA control unit 250, responsive to the command, applies braking power to brake 140. The process moves to step S250.

In step 250, idling-stop control unit 260 stores in memory unit 170 a LSF-start-control flag for initiating LSF-start-control and the process exits.

In step S260, idling stop control unit 260 adds to the engine restart conditions a speed condition that the vehicle speed is higher than a predefined value and performs regular control. And the process exits.

With the above procedure, movement of the vehicle by means of driving force of engine 120 is prevented by changing restarting conditions when LSF is active and prohibiting restart of engine 120 based on detection of vehicle speed.

LSF (low speed following) start control will now be described. This process is a process for restarting engine 120 and to start LSF control under such conditions as the vehicle halted as brake 140 is activated. For LSF control, idling stop control unit 260 adds to the engine restart conditions a condition that braking power is applied by VSA control unit 250, a condition that brake sensor detected pressing of the brake pedal, or a condition that the ego-vehicle halted.

Figure 4:
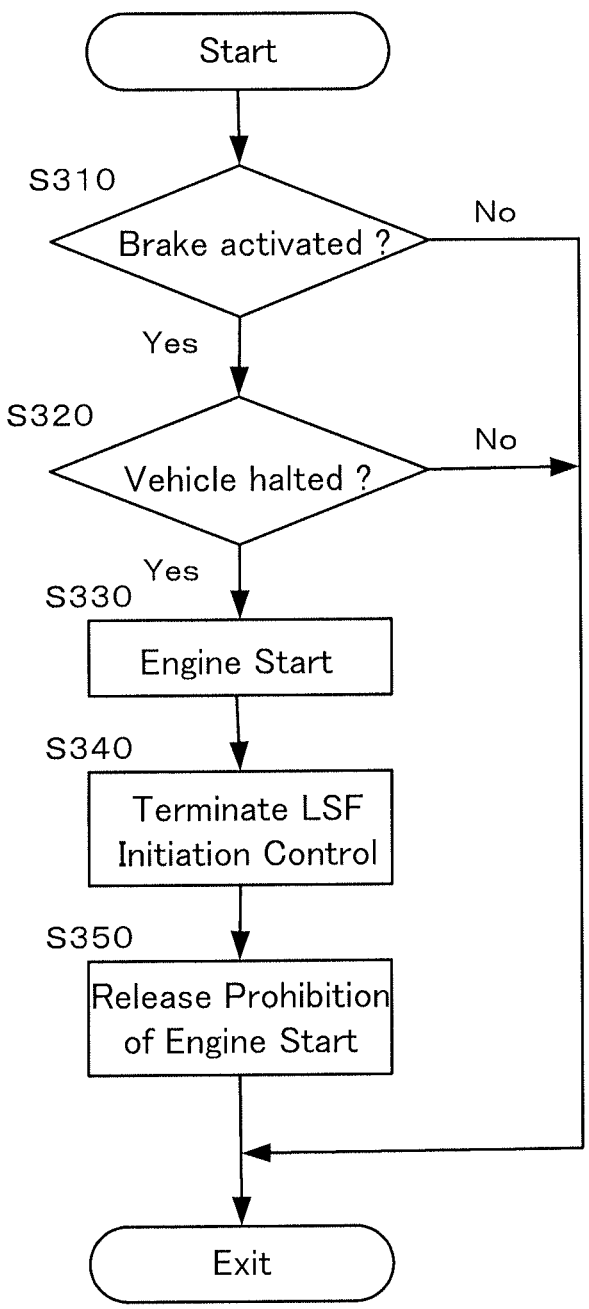
FIG. 4 is a flow chart illustrating the operational steps of LSF (Low Speed Following) starting control of the control unit in accordance with the second embodiment of the present invention.

FIG. 4 is a flow chart illustrating steps of the LSF-start-control in accordance with the second embodiment of the present invention. The process for LSF start is performed when LSF-start-control flag stored in memory unit 170 indicates initiation of LSF-start-control (set in step S250, FIG. 3.).

In association with step S240 (FIG. 3) for prohibiting restarting of the engine, VSA control unit 250 applies increased braking power to brake 140 to halt the vehicle. In step S310, VSA control unit 250 determines activation of brake 140 based on any one of a brake switch, braking liquid pressure, and parking brake sensor 70.

The brake switch is a switch for lighting brake lamp 150. Brake lamp 150 indicates that braking power is applied to the vehicle and is lit not only when the driver presses the brake pedal, but also when VSA control unit 250 automatically applies a braking power. An on-state of the brake switch may indicate pressing of the brake pedal. When the driver presses the brake pedal, it is sensed by brake pedal sensor 50.

Braking liquid pressure higher than a predetermined value as detected by braking liquid pressure sensor 60 also indicates activation of brake 140. An ON-state of parking brake sensor 70 indicates that brake 140 is activated by the driver. If brake 140 is not activated, the process terminates. If brake 140 is activated, the process proceeds to step S320.

In step S320, idling stop control unit 260 determines if the vehicle halted by comparing the vehicle speed calculated by speed calculation unit 230 with a predefined value which corresponds to a halt condition of the vehicle. If the vehicle is not determined to be in a halt state, the process terminates, and if the vehicle is determined to be in a halt state, the process moves to step S330.

In step S330, idling stop control unit 260 restarts engine 120 and the process moves to step S340. In step S340, idling stop control unit 260 resets the LSF start control flag (which was set in step S250, FIG. 3) and the process moves to step S350. In step S350, idling stop control unit 260 releases prohibition of engine-restart and the process (of FIG. 4) exits.

As described above, engine restart conditions are modified such that engine 120 is restarted when it is ascertained that a substantial braking power has been applied to the vehicle based on detection of manipulation of the brake by the driver or based on detection of activation of braking power by VSA control unit 250. Consequently, engine 120 may be restarted while preventing movement of the vehicle.

Alternatively, when either one of determination of brake activation in step S310 and determination of halt state of the vehicle in step S320 is satisfied, the process may proceed to step S330. The determination in step S320 is to determine that the vehicle halted and then moved, and yet halted, which may be a consequence of a manner of activating brake 140.

A Third Aspect

A third aspect of the present invention will now be described. To perform idling-stop while LSF is not active, engine 120 is stopped in a state that the driver presses the brake pedal. Thus, if step-up transformer 130 or VSA is in failure, the vehicle would not make a large movement because the driver has been pressing the brake pedal when engine 120 is to be restarted. However, when the vehicle halted when LSF is active, the brake pedal may not be pressed by the driver. Thus, if step-up transformer 130 or VSA is in failure, movement of the vehicle may be substantial.

To cope with such situations, for some time after engine 120 is initially started by the driver by manipulation of ignition 100 from a parking state, idling-stop is prohibited when the LSF control is active. Once the idling-stop is completed normally, step-up transformer 130, VSA and other relevant items can be assumed to be normal. Failure determining unit 270 determines if the idling-stop is completed normally, and when the determination is positive, the idling-stop during LSF control is permitted.

Thus, for the operation during the LSF control, conditions for the engine-stop include the condition that failure determining unit 270 once determined that the operation is normal. Failure determination for step-up transformer 130, VSA and other relevant items is performed while the LSF control is not active, and only if the determination indicates normal, the idling-stop is permitted when the LSF control is active. This way, such situation as failure of braking power by VSA control unit 250 during the LSF control is avoided.

Figure 5:
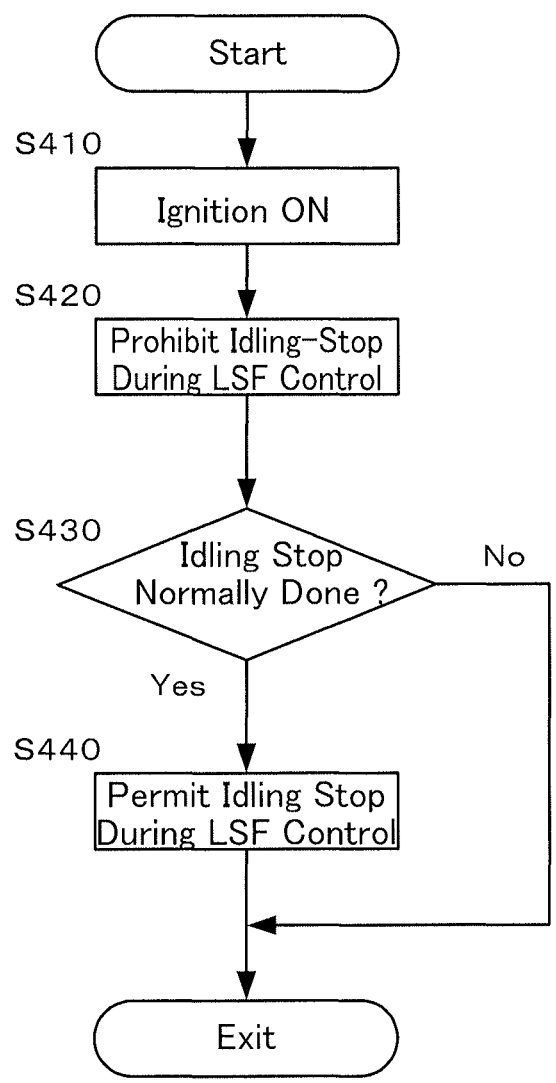
FIG. 5 is a flow chart showing the operational steps of the control unit for a vehicle according to a third embodiment of the present invention.

FIG. 5 is a flow chart showing operational steps of the control unit according to the third aspect of the present invention. In step S410, processing unit 160 detects turning-on of ignition 100 and engine 120 is started from a parking state. The process moves to step S420.

In step S420, idling-stop control unit 260 prohibits idling-stop while the LSF control is active. This is because when the vehicle stayed in parking state for a considerable time, the vehicle conditions are not certain and there may be certain failure or trouble. The process moves to step S430.

In step S430, failure determination unit 270 determines if automatic engine stop and automatic engine start have normally performed and completed. This determination may be made by referring to the determination result stored in memory unit 170.

Normal performance of automatic engine stop and automatic engine start indicates that step-up transformer 130, VSA and relevant items are normal. That is, ht process of step S430 includes failure determination of step-up transformer 130, VSA and relevant items. If the idling-stop has not completed normally, the operation exits this process. If the idling-stop has completed normally, it indicates that there were no failures in step-up transformer 130, VSA and relevant items and the process moves to step S440.

In step S440, idling stop control unit 260 permits idling stop during LSF control and exits this process.

Thus, engine stop during LSF control is prohibited until failure determining unit 270 determines a normal performance, whereby a large movement of the vehicle due to poor braking power provide by VSA control unit 250 during LSF control is prevented.

A Fourth Aspect

Now, a control unit for a vehicle according to a fourth aspect of the present invention will be described. This embodiment ensures responsive property of start when the driver commands initiation of LSF control under the situation that idling-stop took place when step-up transformer 130, VSA or a relevant item is in failure.

To cope with such a situation, initiation of LSF control during engine stop while failure determination by failure determination unit 270 has not completed is added as one of engine restart conditions. That is, under such a situation, engine 120 is restarted.

Figure 6:
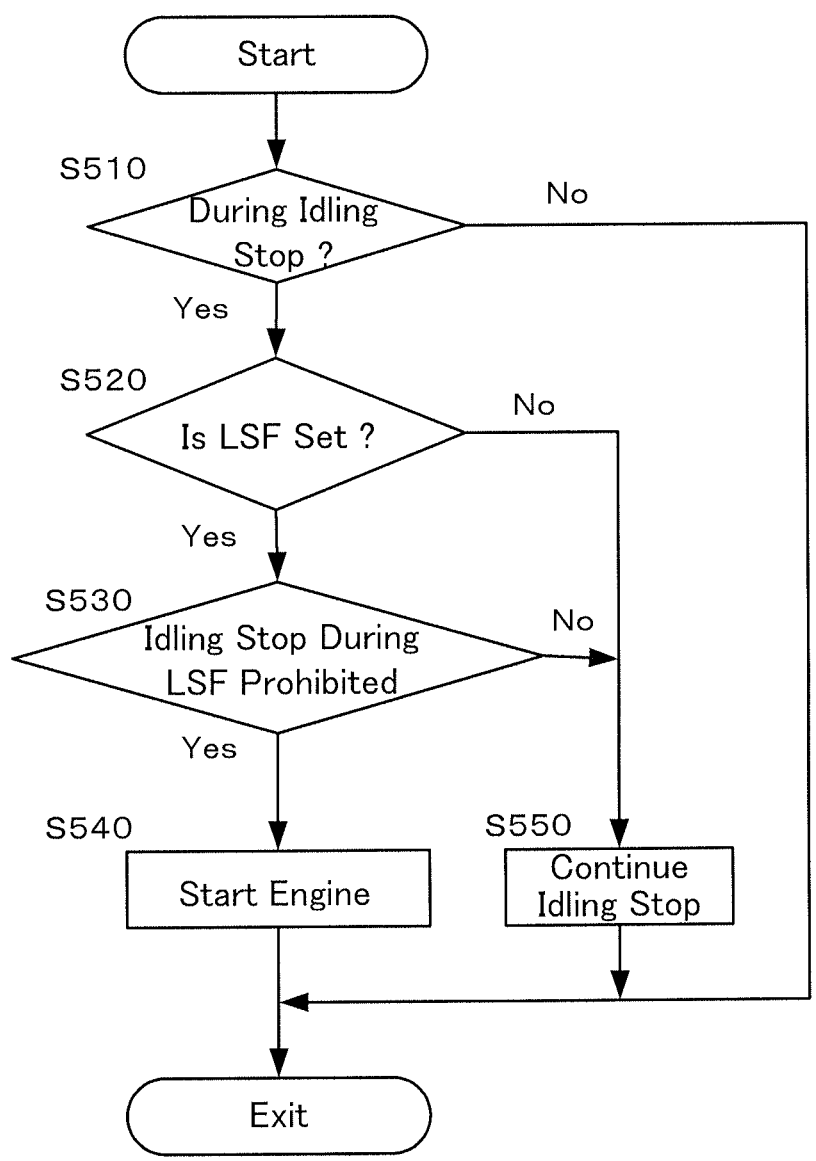
FIG. 6 is a flow chart showing the operational steps of the control unit for a vehicle according to a fourth embodiment of the present invention.

FIG. 6 is a flow chart showing operational steps of the vehicle control unit according to the fourth aspect of the present invention. In step S510, LSF control unit 240 determines if the vehicle is in the state of idling stop. If it is not, the operation exits this process. If the vehicle is in the state of idling stop, the process moves to step S520.

In step S520, LSF control unit 240 determines if LSF control has been set by the driver. The driver may set LSF control using input unit 110. If LSF control has not been set, the process moves to step S550, and if LSF control has been set, the process moves to step S530.

In step S530, determination is made whether or not idling stop during LSF control is prohibited. Doing so may determine that step-up transformer 130 and VSA have not been determined to be normal and that failure determination by failure determining unit 270 has not completed. Such a situation would take place when ignition 100 is activated by the driver, the vehicle pulled out from a parking position and a first idling stop has occurred.

If idling stop during LSF control is not prohibited, the process moves to step S550. If idling stop during LSF control is prohibited, the process moves to step S540.

In step S540, idling stop control unit 260 restarts engine 120. The operation exits this process. In step S550, idling stop control unit 260 continues idling stop. The operation exits this process.

With the above mentioned process, if the driver commands to initiate LSF control when idling stop has taken place despite step-up transformer 130 or VSA has not been determined to be normal, engine 120 is restarted. This way, even if step-up transformer 130 or the like is in failure, responsiveness for a start is ensured by restarting engine 120 at an early timing.

Driver's setting of the initiation of the LSF control during idling stop implies that the driver wishes to maintain a headway to a vehicle ahead of the ego-vehicle and also implies that the driver does not wish to start the ego-vehicle yet. Failure of step-up transformer 130 will cause resetting of VSA. It would be safer to restart engine 120 at an early stage in accordance with the present embodiment rather than facing resetting of VSA when the driver wants to start the vehicle.

A Fifth Aspect

A fifth aspect of the present invention will now be described. While the LSF control is active, the ego-vehicle stops keeping a certain distance from the vehicle ahead. However, the headway would be shortened when the vehicle ahead brakes suddenly or when another vehicle cuts in from a neighboring lane. In such cases, if idling stop takes place and step-up transformer 130 or VSA is in failure and if VSA is reset when the engine is to be restarted, the ego-vehicle may get too close to the vehicle ahead.

To cope with this situation, the condition that the headway to the vehicle ahead is larger than a predetermined distance is added to the conditions for stopping engine while the LSF control is active. Idling stop control unit 260 prohibits idling stop or engine stop and restart operation when the headway to the vehicle ahead is not larger than the predetermined distance. That is, engine 120 is left active.

Figure 7:
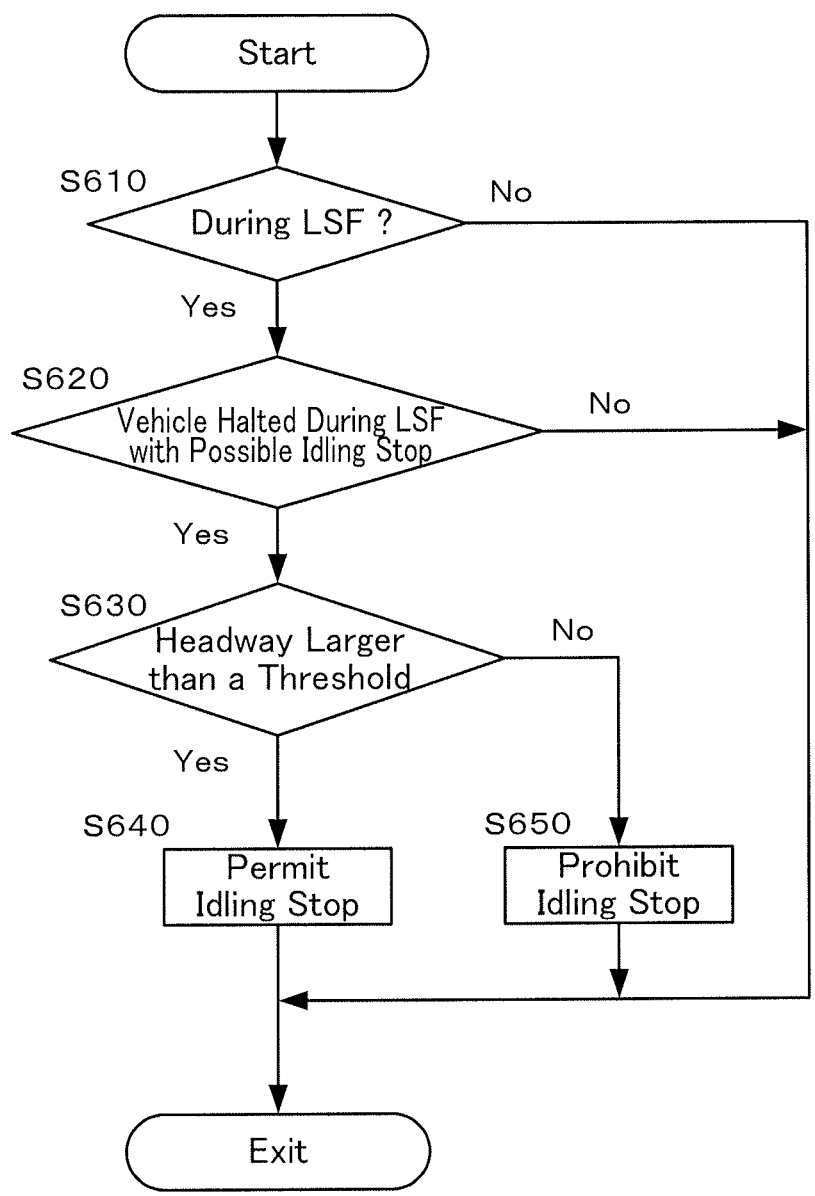
FIG. 7 is a flow chart showing the operational steps of the control unit for a vehicle according to a fifth embodiment of the present invention.

FIG. 7 is a flow chart showing the operational steps of the control unit of the vehicle according to the fifth aspect of the present invention. In step S610, idling stop control unit 260 determines if the LSF control is active. If it is not, the operation exits this process. If the determination is positive, the process moves to step S620.

In step S620, determination is made if the vehicle halted during SF control with possible idling stop. If it is not a halt with possible idling stop during LSF, the process moves to step S650. If it is a halt with possible idling stop during LSF, the process moves to step S630.

In step S630, determination is made if the headway to the vehicle ahead calculated by headway calculation unit 210 is larger than a predetermined threshold. If it is not larger than the threshold, the process moves to step S650. If it is larger than the threshold value, the process moves to step S640.

In step S640, idling stop control unit 260 permits idling stop, and the operation exits this process. In step S650, idling stop control unit 260 prohibits idling stop, that is, engine 120 will not be stopped. The operation exits this process.

With the above described process, the condition that the headway to the vehicle ahead is larger than a threshold value is added to the engine stop conditions when the vehicle stops during LSF control. If the headway to the vehicle ahead is small, idling stop is prohibited. Thus, possible troubles that may arise in restart from idling stop may be avoided.

Figure 8:
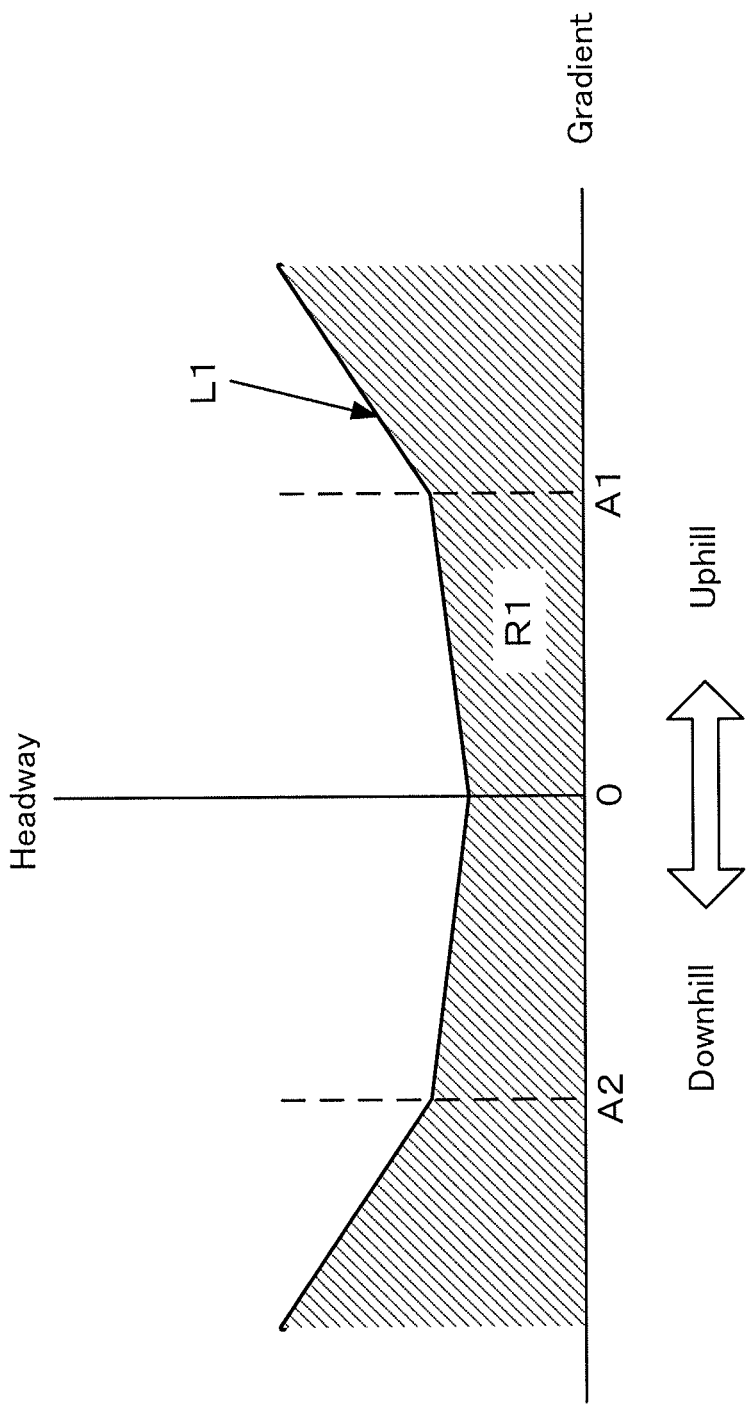
FIG. 8 is a chart illustrating a range of prohibitive headway distance relative to gradient of the road.

The threshold value for the headway as compared in step S630 may be set according to the gradient of a road surface. FIG. 8 illustrates a range of prohibitive headway relative to the gradient of a road surface. The larger the gradient of the road surface, the larger the absolute value of the distance threshold L1 is, that is the headway should be larger as the gradient becomes larger. In FIG. 8, region RI indicates the region where idling stop is prohibited. The gradient of the road surface is calculated by gradient calculation unit 220.

The threshold values L1 relative to gradient of the road surface as indicated in FIG. 8 are stored in memory unit 170 in the form of a table. Idling stop control unit 260 fetches threshold values L1 from memory unit 170 based on the gradient calculated by gradient calculation unit 220 so as to perform the process of step S630. Thus, threshold varies according to gradient of the road surface so that unnecessary prohibition of idling stop in the case of a large headway is avoided.

For the moderate gradient in the range between upward gradient A1 and downward gradient A2 as shown in FIG. 8, increment of threshold value L1 along the gradient may be small. For the gradient larger than upward gradient A1 or downward gradient A2, increment of threshold value L1 along the gradient may be made larger. This way, safety in the steep slope may be improved.

For the upward gradient, the vehicle is biased in the downward direction. Therefore, idling stop may not be prohibited even if the headway to the vehicle ahead is small. The threshold L1 may be made variable according to the gradient only for downward gradients.

Though the headway is defined as the distance from the ego-vehicle to the vehicle ahead, it may be defined as the difference between a target headway and a real headway. That is, the difference between the target headway and the real headway is compared with headway threshold values, and prohibition of the idling stop may be determined based on this comparison. The target headway may be set by the driver using input unit 110. For example, the target headway may be arbitrarily set between 3 m~5 m, or may be set in step-wise.

Thus, using the headway between the ego-vehicle and the vehicle ahead or using the difference between the target headway and the real headway, appropriate determination may be made.

A Sixth Aspect

Now, a sixth aspect of the control unit of the vehicle according to the present invention will be described. In the fifth aspect, idling stop is controlled during LSF control according to the headway to the vehicle ahead. In the sixth aspect, idling stop is controlled according to warm-up conditions of engine 120.

In case temperature of the cooling water for engine 120 is low, revolution of engine 120 is raised to generate heat to warm up the vehicle. Warm-up or warm-up operation is an operation to maintain a operating condition with a low load for a certain period after the engine is started in a clod environment so as to raise the temperature of various mechanical elements such as engine 120 to a certain degree. Higher revolution of the engine 120 produces higher driving force. Because of this, a possibility arises that the vehicle moves when the engine is restarted from idling stop.

To cope with this problem, while the LSF control is active under the condition that the vehicle is not substantially warmed-up, idling stop control unit 260 prohibits idling stop, thereby prohibiting engine stop and restart. For this purpose, idling stop control unit 260 changes the temperature threshold as one of the conditions for engine stop to a higher value during SF control, whereby idling stop is prohibited unless the temperature of engine 120 detected by water temperature sensor 80 is higher than the threshold value.

Warm-up conditions of the vehicle may be determined by the temperature of lubrication oil for engine 120. Thus, idling stop control unit 260 may prohibit idling stop, thereby prohibiting engine stop and restart, responsive to the temperature of the lubrication oil for engine 120. This way, this method may be used with engines of the other type than cooling-water type.

Also, determination of warm-up of engine 120 may be made based on a target revolution of engine 120. During warm-up operation, the target revolution of engine 120 for idling is set to a higher value than normal. As the engine warms up, the target revolution lowers. Thus, during LSF control, the engine stop conditions may be changed such that idling stop may be prohibited, hereby prohibiting engine stop and restart, unless the target revolution of engine 120 for idling is lower than a threshold.

Figure 9:
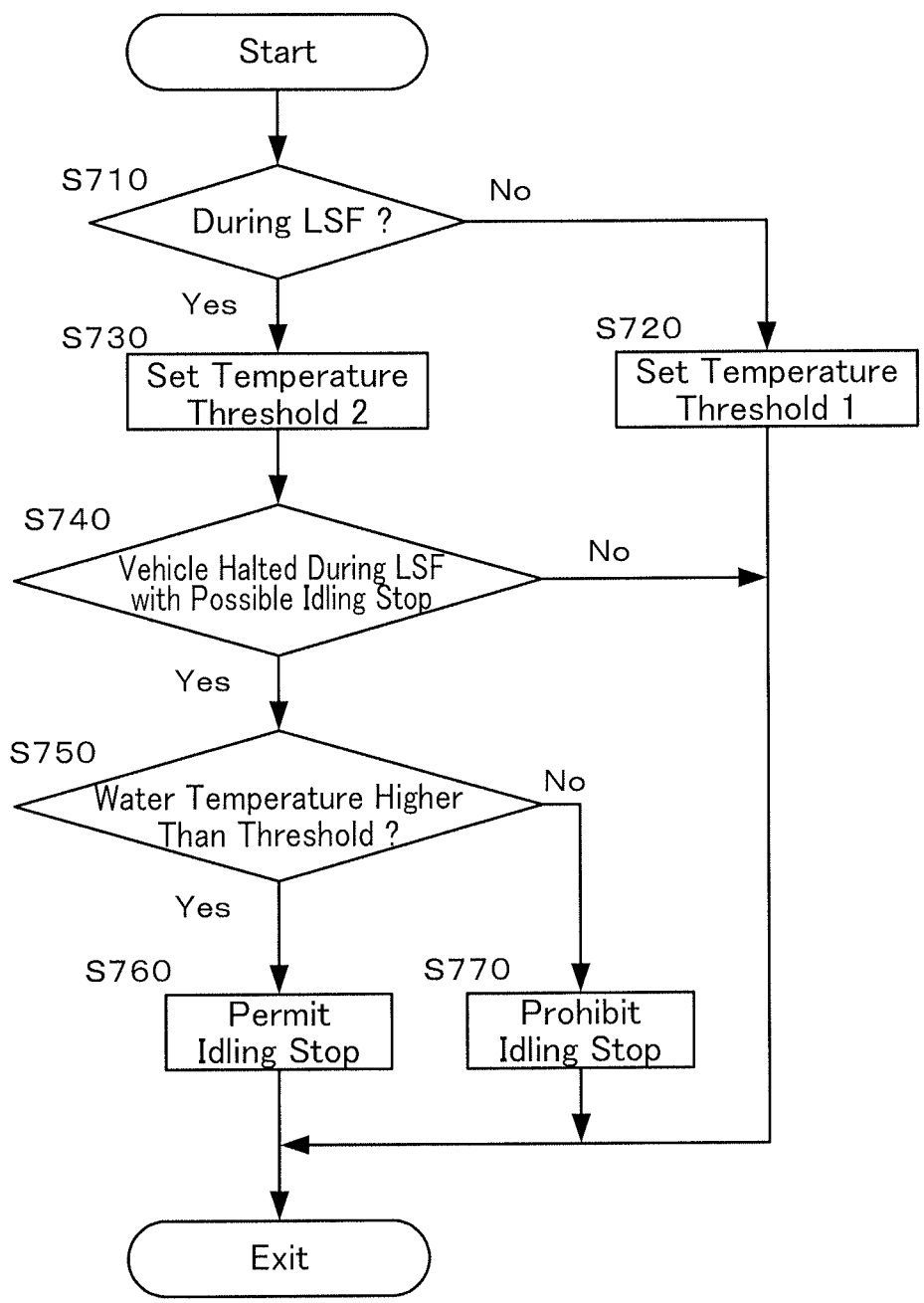
FIG. 9 is a flow chart showing the operational steps of the control unit for a vehicle according to a sixth embodiment of the present invention.

Use of temperature of the cooling water of engine 120 for control in an embodiment of the present invention will be described. FIG. 9 is a flow chart illustrating operational steps of the sixth embodiment of the vehicle control unit according to the present invention will be described.

In step S710, idling stop control unit 260 determines if LSF is active. If it is not, the process moves to step S720. If it is active, the process moves to step S730.

In step S720, idling stop control unit 260 sets temperature threshold 1, a regular temperature threshold, as a temperature condition for idling stop. The temperature thresholds are stored in memory unit 170. The operation exits this process.

In step S730, idling stop control unit 260 sets temperature threshold 2 as a temperature threshold, threshold 2 being higher than threshold 1. The operation moves to step S740.

In step S740, determination is made if the ego-vehicle halted during LSF control with possible idling stop. If negative, the operation exits this process. If positive, the process moves to step S750.

In step S750, determination is made if the temperature of cooling water for the engine detected by water temperature sensor 80 is higher than the threshold. If negative, the process moves to step S770. If positive, the process moves to step S760.

In step S760, idling stop control unit 260 sets to permit idling stop. The operation exits this process.

In step S770, idling stop control unit 260 sets to prohibit idling stop, that is prohibit engine 120 to stop. The operation exits this process.

With the above described process, troubles that may arise when the engine is restarted from idling stop can be prevented as idling stop is prohibited when the temperature of the engine cooling water is lower (than the modified temperature threshold 2).

When the temperature of lubrication oil is used in lieu of the temperature of the cooling water, in step S750, the temperature of engine lubrication oil detected by temperature sensor 90 of lubrication oil is checked to see if it is higher than a predetermined threshold.

When a target idling revolution is used in lieu of the temperature of the cooling water, a regular revolution threshold is set in step S720, and a threshold lower than the regular threshold is set in step S730. In step S750, determination is made as to whether or not the target idling revolution is lower than the predetermined revolution.

Figure 10:
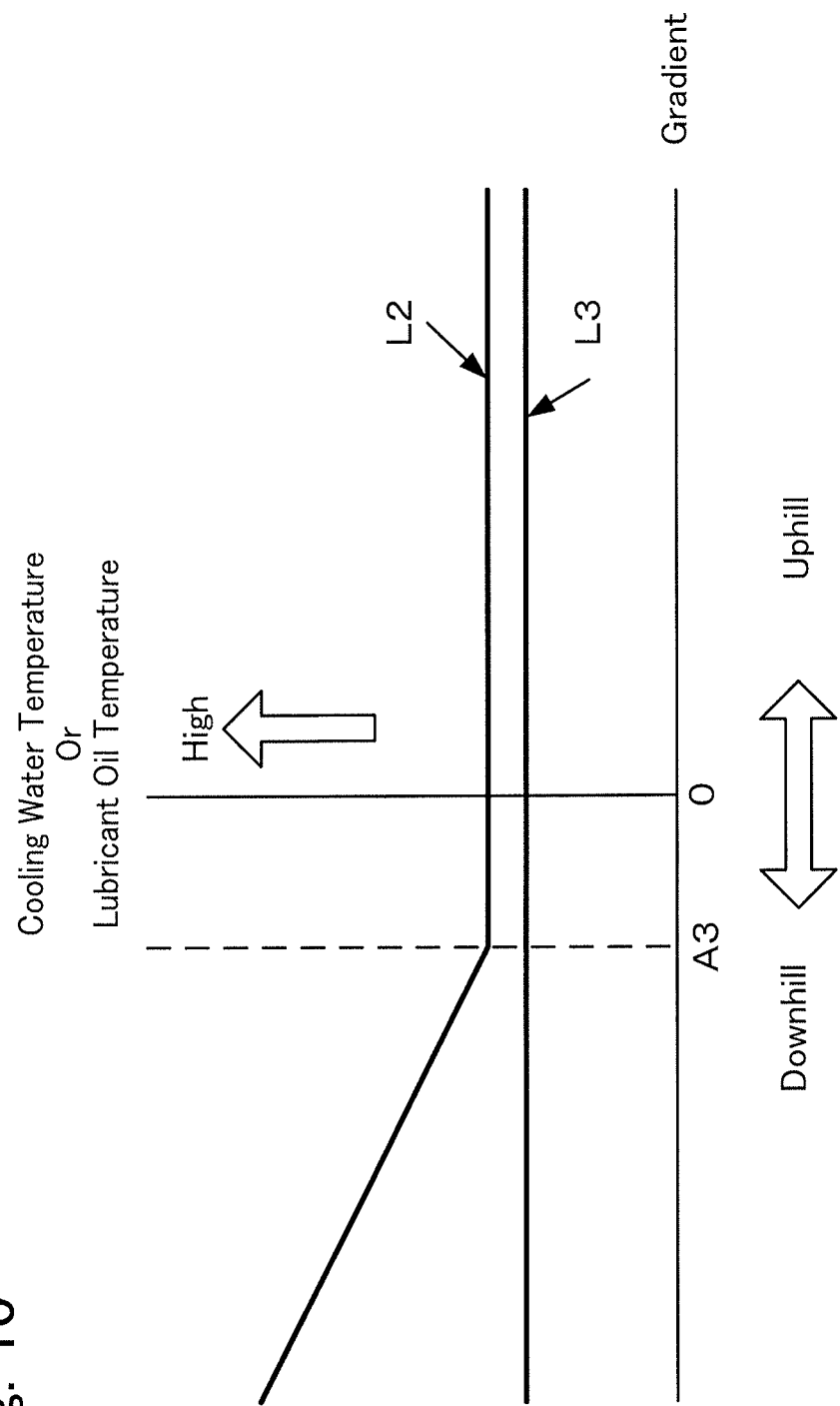
FIG. 10 is a char illustrating temperature threshold relative to gradient of the road.

The temperature threshold 2 that is set in step S730 may be determined according to the gradient of the road surface. FIG. 10 illustrates temperature threshold according to the gradient.

As shown in FIG. 10, temperature threshold L2 for cooling water or lubrication oil during LSF control is higher than temperature threshold L3 for the period when LSF control is not active. Temperature threshold L2 for the period when LSF control is active is made increasingly higher as the gradient in downhill becomes larger. That is, the temperature for permitting idling stop is made higher. The gradient of the road is calculated by gradient calculating unit 220. The region between gradient zero and gradient A3 is regarded as a flat plane as the downhill gradient is substantially small.

The temperature threshold according to the gradient is formed into a table and is stored in memory unit 170. Idling stop control unit 260 fetches temperature threshold L2 from memory unit 170 on the basis of the gradient calculated by gradient calculating unit 220 to perform the process of step S730.

Thus, by varying the temperature threshold according to the gradient of the road, unnecessary prohibition of idling stop in uphill or a gentle downhill may be prevented. Also, safety in a steep gradient may be ensured.

As described above, in the control unit for a vehicle as exemplified in the first embodiment through the sixth embodiment comprises idling stop control unit 260 for stopping engine 120 upon satisfaction of predetermined stop conditions and for restarting engine 120 upon satisfaction of predetermined restart conditions, and LSF control unit 240 for controlling the ego-vehicle to follow a vehicle ahead upon satisfaction of predetermined following control conditions.

Idling stop control unit 260 may modify stop conditions or restart conditions while following control by LSF control unit 240 is active.

With this structure, inadvertent movement of the ego-vehicle that may take place when the ego-vehicle halts during LSF control by the operation of VSA control unit 250 and idling stop took place while the ego-vehicle is in halt. Such movement would be caused when voltage drops due to failure of step-up transformer 130 at the time of cranking for restarting engine 120, thereby resetting VSA The present invention is not limited to the specific embodiments described above. Various modifications may be made within the scope of the present invention. For example, various units included in processing unit 160 including idling stop control unit 260 may not be partitioned into the disclosed structure, rather all the functions may be performed by processing unit 160.

What is claimed is:

1. A control unit for an ego-vehicle, comprising:
an automatic engine stop-and-restart unit for stopping an engine of the ego-vehicle upon satisfaction of predetermined stop conditions and for restarting the engine upon satisfaction of predetermined restart conditions; and a following cruise control unit for controlling the ego-vehicle to follow a vehicle travelling ahead of the ego-vehicle upon satisfaction of predetermined following cruise control conditions;

wherein the automatic engine stop-and-restart unit is configured to modify at least one of the stop conditions and restart condition while the following cruise control by the following cruise control unit is active, and the control unit further comprising a gradient sensor for acquiring gradient of the road where the ego-vehicle is, wherein the stop conditions include gradient condition requiring the gradient of the road as acquired by the gradient sensor is smaller than a gradient threshold; and wherein, while the following cruise control is active, the automatic engine stop-and-restart unit modifies the gradient threshold to a smaller value than a value that is used while the following cruise control is not active.

2. A control unit for an ego-vehicle, comprising:

an automatic engine stop-and-restart unit for stopping an engine of the ego-vehicle upon satisfaction of predetermined stop conditions and for restarting the engine upon satisfaction of predetermined restart conditions; and a following cruise control unit for controlling the ego-vehicle to follow a vehicle travelling ahead of the ego-vehicle upon satisfaction of predetermined following cruise control conditions;

wherein the automatic engine stop-and-restart unit is configured to modify at least one of the stop conditions and the restart conditions while the following cruise control by the following cruise control unit is active, and the control unit further comprising:

a unit for determining warm-up condition of the engine;

wherein stop conditions include at least one of a) a temperature of engine cooling water or a temperature of lubrication oil is higher than a predefined temperature threshold, and b) a target revolution of the engine is lower than a predefined revolution threshold; and wherein the automatic engine stop-and-restart unit modifies at least one of, for a period during which the following cruise control is active, c) the temperature threshold to a value higher than a value for a period during which the following cruise control is inactive, and d) the revolution threshold to a value lower than a value for a period during which the following cruise control is inactive.

3. A control unit for an ego-vehicle, comprising:

an automatic engine stop-and-restart unit for stopping an engine of the ego-vehicle upon satisfaction of predetermined stop conditions and for restarting the engine upon satisfaction of predetermined restart conditions; and a following cruise control unit for controlling the ego-vehicle to follow a vehicle travelling ahead of the ego-vehicle upon satisfaction of predetermined following cruise control conditions;

wherein the automatic engine stop-and-restart unit is configured to modify at least one of the stop conditions and the restart conditions while the following cruise control by the following cruise control unit is active, and the control unit further comprising a speed sensor for detecting the speed of the ego-vehicle, wherein the restart conditions include a speed condition that the vehicle speed as detected by the speed sensor is larger than a predetermined value while the following cruise control is inactive, said speed condition being excluded while the following cruise control is active.

4. The control unit for the ego-vehicle as defined in claim 3, further comprising a gradient sensor for acquiring gradient of the road where the ego-vehicle is, wherein the restart conditions include a speed condition that the vehicle speed as detected by the speed sensor is larger than a predetermined value while the following cruise control is inactive, said speed condition being excluded while the following cruise control is active and downhill cruise has been determined in accordance with the gradient acquired by the gradient sensor.

5. The control unit for the ego-vehicle as defined in claim 3, further comprising:

a brake control unit for controlling braking power applied to the ego-vehicle; and a brake sensor for detecting activation of a brake pedal by a driver;

wherein when the vehicle speed is detected to be higher than the predetermined value while the following cruise control is active, the brake control unit applies braking power to the ego-vehicle, and the automatic engine stop-and-restart unit adds to the restart conditions at least one of:

a condition that the brake control unit applied braking power, a condition that the brake sensor detected that a brake pedal was pressed, and a condition that the ego-vehicle halted.

6. The control unit for the ego-vehicle as defined in claim 4, further comprising:

a brake control unit for controlling braking power applied to the ego-vehicle; and a brake sensor for detecting activation of a brake pedal by a driver;

wherein when the vehicle speed is detected to be higher than the predetermined value while the following cruise control is active, the brake control unit applies braking power to the ego-vehicle, and the automatic engine stop-and-restart unit adds to the restart conditions at least one of:

a condition that the brake control unit applied braking power, a condition that the brake sensor detected that a brake pedal was pressed, and a condition that the ego-vehicle halted.

7. The control unit for an ego-vehicle as defined in any one of claims 1, 3 and 2, further comprising:

a failure determination unit for determining if the automatic engine stop-and-restart has been normally performed by the automatic engine stop-and-restart unit while said following cruise is inactive;

wherein the automatic engine stop-and-restart unit adds to the stop conditions a condition that the failure determination unit has determined a normal performance while the following cruise control is active.

8. The control unit for an ego-vehicle as defined in any one of claims 1, 3 and 2, further comprising:

a failure determination unit for determining if the automatic engine stop-and-restart has been normally performed by the automatic engine stop-and-restart unit while said following cruise is inactive;

wherein the automatic engine stop-and-restart unit adds to the restart conditions a condition that the following cruise control be initiated while determination has not been performed by the failure determination unit.

9. The control unit for an ego-vehicle as defined in any one of claims 1, 3 and 2, wherein the automatic engine stop-and-restart unit adds to the stop conditions a condition that a headway to a vehicle ahead is larger than a predefined headway threshold when the ego-vehicle halted by the following cruise control while the following cruise control is active.

10. The control unit for an ego-vehicle as defined in claim 9, further comprising:
 a gradient sensor for detecting gradient of a road where the ego-vehicle is;
 wherein the headway threshold is modified according to the gradient detected by the gradient sensor.

* * * * *